United States Patent
Damidaux et al.

(10) Patent No.: US 8,812,937 B2
(45) Date of Patent: Aug. 19, 2014

(54) METHOD FOR IMPROVING THE ACQUISITION OF A DATA SET TRANSMITTED REPEATEDLY IN A DIFFICULT ENVIRONMENT

(75) Inventors: Jean-Louis Damidaux, Auzielle (FR); Jean-Christophe Levy, Balma (FR)

(73) Assignee: Thales, Neuilly sur Seine (FR)

( * ) Notice: Subject to any disclaimer, the term of this patent is extended or adjusted under 35 U.S.C. 154(b) by 173 days.

(21) Appl. No.: 13/127,383

(22) PCT Filed: Nov. 4, 2009

(86) PCT No.: PCT/EP2009/064645
§ 371 (c)(1),
(2), (4) Date: May 3, 2011

(87) PCT Pub. No.: WO2010/052252
PCT Pub. Date: May 14, 2010

(65) Prior Publication Data
US 2011/0209034 A1    Aug. 25, 2011

(30) Foreign Application Priority Data
Nov. 4, 2008   (FR) ...................................... 08 06136

(51) Int. Cl.
  *H03M 13/00* (2006.01)
(52) U.S. Cl.
  USPC .......................................... 714/776; 714/712
(58) Field of Classification Search
  USPC ......................... 714/782, 776, 712
  See application file for complete search history.

(56) References Cited

U.S. PATENT DOCUMENTS

| | | | |
|---|---|---|---|
| 6,421,357 B1* | 7/2002 | Hall | 370/479 |
| 2004/0216016 A1* | 10/2004 | Olaker | 714/709 |
| 2007/0245206 A1* | 10/2007 | Martin et al. | 714/752 |
| 2008/0260001 A1* | 10/2008 | Betz et al. | 375/140 |
| 2008/0301523 A1* | 12/2008 | Eudes | 714/758 |
| 2011/0083056 A1* | 4/2011 | Choi et al. | 714/756 |
| 2012/0149299 A1* | 6/2012 | Laish et al. | 455/9 |

FOREIGN PATENT DOCUMENTS

| | | | |
|---|---|---|---|
| JP | 62131636 A | 6/1987 | |
| JP | 2001197144 A | 7/2001 | |
| WO | 99/67897 A1 | 12/1999 | |
| WO | 01/78295 A1 | 10/2001 | |
| WO | WO 0178295 A1 * | 10/2001 | H04L 1/18 |
| WO | 0186837 A1 | 11/2001 | |

OTHER PUBLICATIONS

Zencik, R.G., Jr.; Kohlhepp, K.; , "GPS micro navigation and communication system for clusters of micro and nanosatellites," Aerospace Conference, 2001, IEEE Proceedings. , vol. 5, No., pp. 2515-2522 vol. 5, 2001.*

(Continued)

*Primary Examiner* — Cynthia Britt
(74) *Attorney, Agent, or Firm* — Baker Hostetler LLP

(57) ABSTRACT

A method is provided for improving the acquisition of a data set transmitted repeatedly in a difficult environment, which is particularly appropriate to satellite radionavigation systems. The main characteristic of the method is to provide "contextual" aid relating to the transmitted data by indicating the nature and the possible updating of these data so that the receiver can accumulate the energy when the data are repeated in an identical manner. These aid data being short, it is possible to obtain good quality of reception and protection of this aid by virtue of its longer coding than that of the data.

4 Claims, 3 Drawing Sheets

(56) References Cited

OTHER PUBLICATIONS

Shambayati, S.; Jones, C.R.; Divsalar, D.; , "Maximizing throughput for satellite communication in a hybrid FEC/ARQ scheme using LDPC codes," Military Communications Conference, 2005. MILCOM 2005. IEEE , vol., No., pp. 3289-3298 vol. 5, Oct. 17-20, 2005.*

P. Decker, "An Adaptive Type-II Hybrid ARQ/FEC Protocol Suitable for GSM", 44th Stockholm Vehicular Technology Conference, Jun. 8-10, 1994, pp. 330-333, IEEE, New York, NY, XP010123101.

* cited by examiner

METHOD FOR IMPROVING THE ACQUISITION OF A DATA SET TRANSMITTED REPEATEDLY IN A DIFFICULT ENVIRONMENT

CROSS-REFERENCE TO RELATED APPLICATIONS

This application is a National Stage of International patent application PCT/EP2009/064645, filed on Nov. 4, 2009, which claims priority to foreign French patent application No. FR 0806136, filed on Nov. 4, 2008, the disclosures of which are incorporated by reference in their entirety.

FIELD OF THE INVENTION

The present invention pertains to a method for improving the acquisition of a data set transmitted repeatedly in a difficult environment.

BACKGROUND

In the field of the acquisition of data transmitted by satellite navigation systems, the technical problem posed is that:
The navigation data are transmitted with the aid of navigation signals whose power is extremely low,
The users have to receive these data in environments which enormously attenuate these signals,
Reception may be interrupted by maskings of the line of sight.

In order to improve the error rate in the words received (WER for "Word Error Rate"), the data may be encoded as symbols with the aid of various codings (Viterbi, Turbo Code, BCH, Low Density Parity Code [LDPC], etc.). Correct reception of the symbols, and then of the data, is directly related to the energy associated with each symbol.

The known solutions for improving reception are as follows:
Transmit the symbols at a predictable instant and at a predictable location so as to be able to accumulate the energy corresponding to each symbol. This is the solution adopted for sub-frames 1 and 2 of GPS L1C. It is not suited to the transmission of data where the timing of the transmitted data is carried out dynamically, because the data of sub-frames 1 and 2 are transmitted at known times in the course of the frame, thus implying that these data are transmitted implicitly in a synchronous manner, because the frames must be synchronous. This is illustrated by FIG. 1, according to which, for example eight data ("Word 1" . . . "Word 8", as in the examples of the following figures) are coded, and then transmitted one after the other ("Coded word 1" . . . "Coded word 8"). On reception, after decoding of the successive coded words (in the case of FIG. 1, the decoding of "Coded word 1" must produce "Word 1"), if the receiver has been able to receive sufficient symbols (of "Word 1" in the present case), the corresponding datum is available ("Word 1" rectangle), otherwise, if the receiver has not accumulated enough energy for this datum or if too many symbols have been lost during transmission, the decoding produces a "Nothing" cue.
Increase the energy transmitted per symbol, this not being permitted by the regulations and does not solve the problem of maskings
Increase the duration of a symbol, but this reduces the quantity of symbols that the system can transmit. Moreover, the performance is still limited by the energy associated with each symbol.
Increase the robustness of the coding by increasing the size of this coding. The drawback is the reduction in the bandwidth which is already very limited. Moreover, reception performance is still limited by the energy associated with each message. This is illustrated by FIG. 2 according to which the successive data ("Word 1" . . . "Word 8") are coded, and then transmitted for example three times each ("Coded word 1", "Coded word 1", "Coded word 1", . . . "Coded word 8", "Coded word 8", "Coded word 8"). In a manner analogous to the case of FIG. 1, on reception, the decoding produces as output either the transmitted words if the receiver receives sufficient symbols, or a "Nothing" cue in the converse case.

SUMMARY OF THE INVENTION

The subject of the present invention is a method for improving the acquisition of data or data sets transmitted repeatedly in a difficult environment, which method allows the acquisition improvement in the majority of cases, even when transmission of data is carried out dynamically, while complying with the regulations if satellite radionavigation data is involved, without reducing reception performance or bandwidth.

The method in accordance with the invention is characterized in that on transmission, to each datum or data set is added as preamble an identification cue for these data which is shorter than these data as a whole and better coded than them with a view to a more robust acquisition of this data set, that on reception, each incident datum or data set is identified with the aid of the identification cue, the energy of the data or data sets having the same identification cue is accumulated, and that when a sufficient quantity of energy has been accumulated, the corresponding data set or datum is recognized as valid.

Hereinafter, the term datum will be used to designate equally a datum or a set of data.

The main characteristic of the invention is to provide a "contextual" aid relating to the transmitted data by indicating the nature and the possible updating of these data so that the receiver can accumulate the energy when the data are repeated in an identical manner. These aid data being short, it is possible to obtain good quality of reception and protection of this aid by virtue of its longer coding than that of the data.

In a radionavigation system, numerous cues (Ephemerides, almanacs, etc.) are repeated over time either on several frequencies, or by several satellites, so as to provide the services at each instant at each point of the globe, thereby affording numerous opportunities to accumulate the energy received for each datum.

BRIEF DESCRIPTION OF THE DRAWINGS

The present invention will be better understood on reading the detailed description of an embodiment, taken by way of nonlimiting example and illustrated by the appended drawing in which.

DETAILED DESCRIPTION

The method of the invention is described hereinbelow with reference to the acquisition of navigation data originating from radionavigation satellites, in particular in a difficult environment (disturbed environment, masking of the line of sight, etc.) but it is of course understood that the invention is not limited to this application alone, and that it may be implemented when it is desired to improve the reception of data in a difficult environment, whatever they be, on condition that they are transmitted in a repetitive and identical manner.

Figure 1:
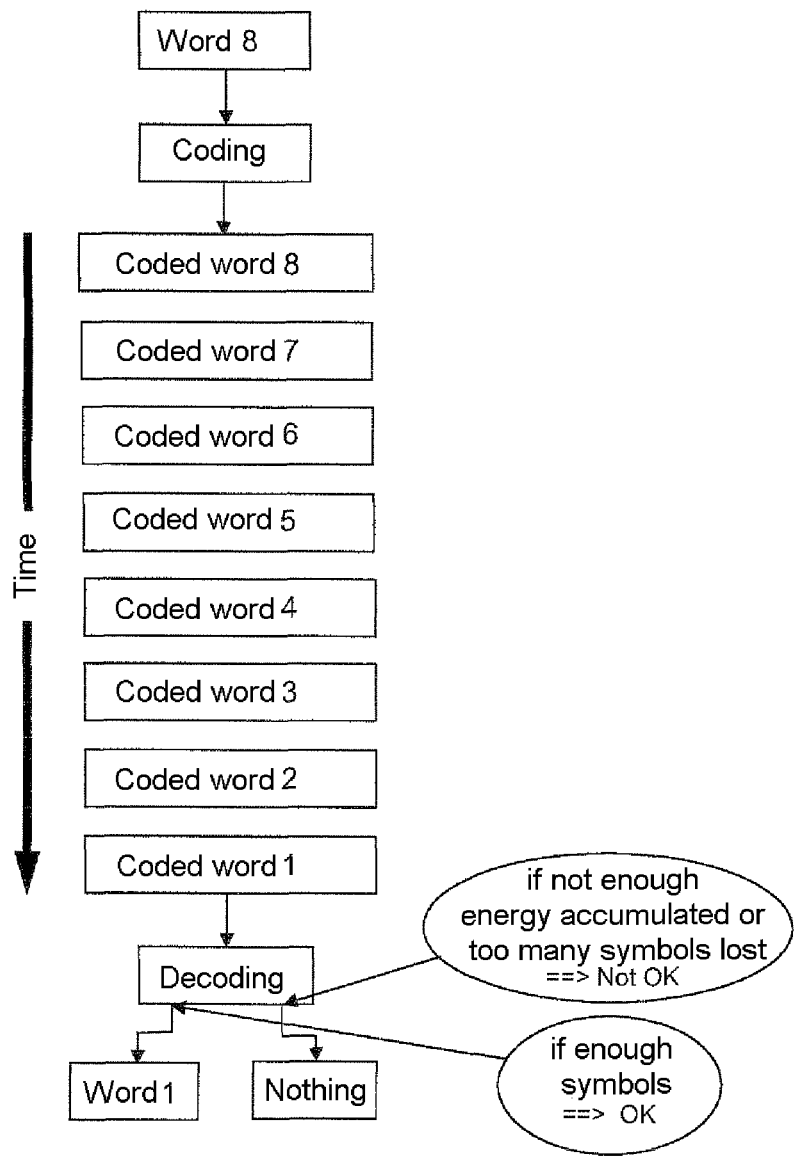
FIGS. 1 and 2, already described hereinabove, are simplified timecharts of the main steps of the methods of the prior art.
Figure 2:
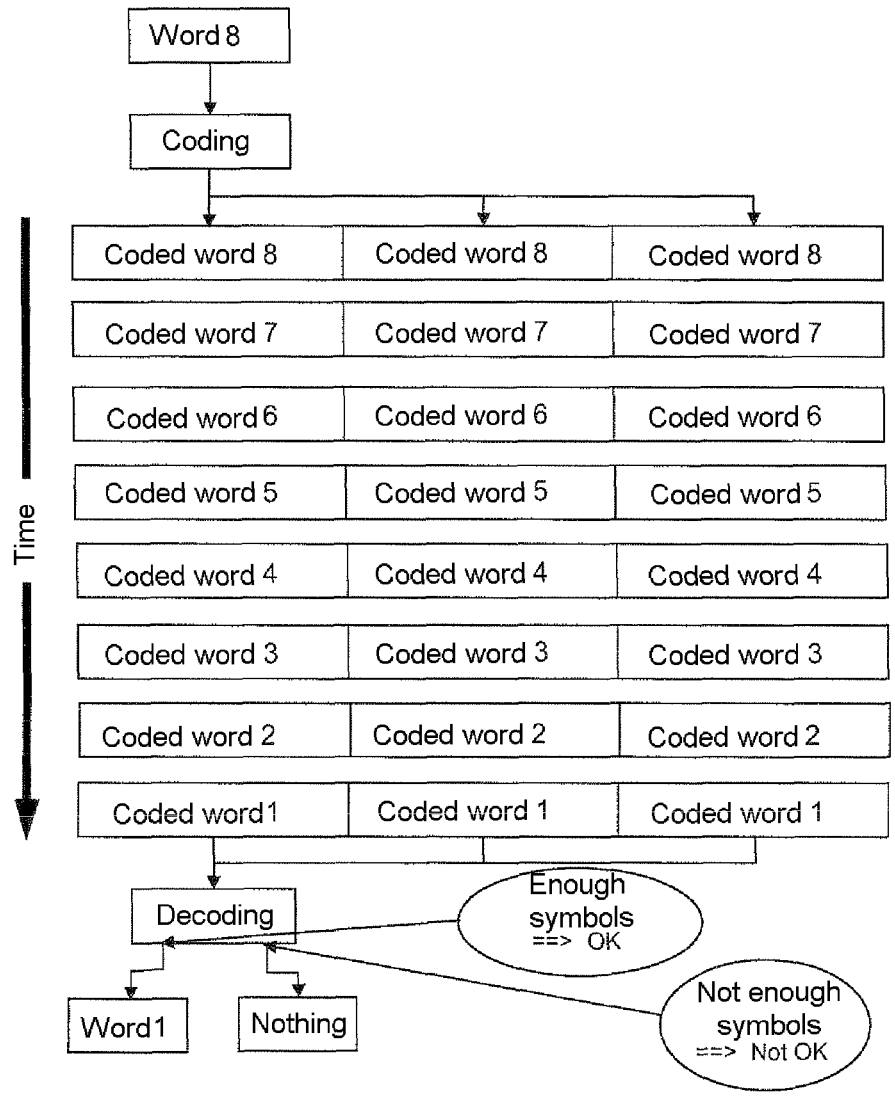
Figure 3:
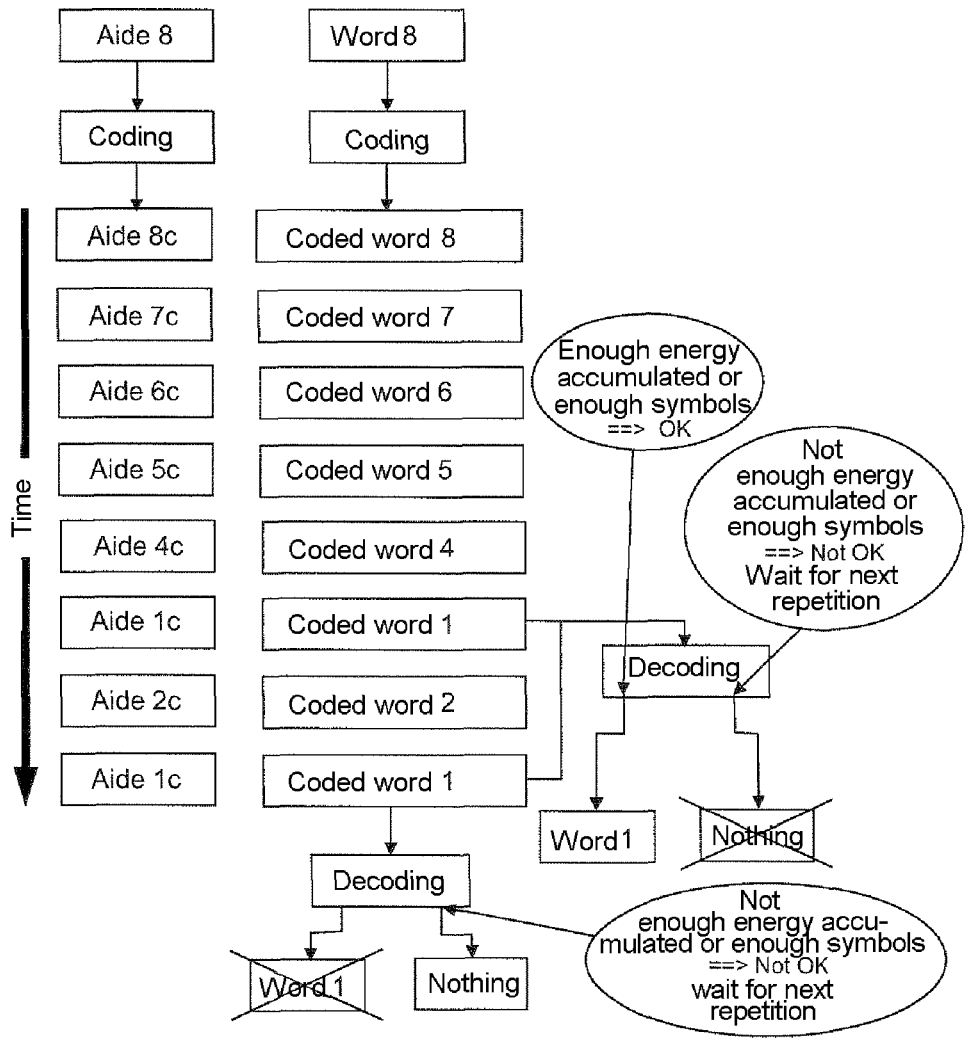
FIG. 3 is a simplified timechart of the main steps of the method in accordance with the present invention.

The implementation of the method of the invention has been illustrated in FIG. 3. Thus, the transmitter processes, at the same time as each datum or data set ("Word 1" ... "Word 8"), a corresponding identification cue ("Aid 1" ... "Aid 8"). This identification cue is processed in the guise of preamble of the corresponding datum. The identification cues are advantageously shorter than the data that they identify. For example, for data having a length of between 500 and 1000 bits approximately, the identification cues can have a length of 9 bits before coding and 52 bits after BCH coding.

The coding, before transmission, of the identification cues "Aid 1" ... "Aid 8" successively provides the coded identification cues "Aid 1c" ... "Aid 8c" which are multiplexed with the corresponding coded data "Coded word 1" ... "Coded word 8", the result of the multiplexing being transmitted, and then demultiplexed on reception. The coded identification cues received are decoded separately from the corresponding data by a function, not represented in the drawing.

In the example of FIG. 3, it is assumed that the first occurrence of the datum "Coded word 1" is received by the receiver in a defective manner (it does not carry sufficient accumulated energy and/or does not contain enough symbols), therefore its first decoding (represented at the very bottom of FIG. 3) provides only the "Nothing" cue, the output for decoded data (which should have provided "Word 1") being disabled. This is followed by the decoding of the next coded datum "Coded word 2", which is assumed to be correct, its decoding then producing "Word 2".

As, by assumption, the data are transmitted in an identical and repeated manner, on the next occurrence of the datum "Coded word 1" in the receiver, it is assumed that this coded datum contains sufficient accumulated energy and/or symbols, and that it can therefore be decoded correctly, this being represented in the right part of FIG. 3: "Word 1" is in fact obtained as decoding output, and the "Nothing" output is disabled. Here it will be noted that the numbers adjoining "Word" do not represent sequential serial numbers, but only identifiers.

The advantage of the solution of the invention is to allow the reception of navigation data while accumulating as far as is necessary the energy transmitted, by virtue of the fact that, on the one hand, the coded identification cues, related to the corresponding data, are coded in a more robust manner than these data and are shorter than them, and therefore statistically have much more chance of being received correctly by the receiver, and that, on the other hand, these identification cues make it possible to tag the symbols of the coded data and therefore to accumulate them in the location where they are stored, doing so even if the coded data are transmitted in a non-synchronous manner.

The fact of having to transmit an aid by means of a coding that is sufficiently long as to guarantee good quality of reception and protection of this aid does not constitute a drawback insofar as, in a system already requiring the transmission of data having the same robustness constraint, it is in fact merely a matter of lengthening this transmission of data. For example Galileo's "Safety of Life" service requires the transmission of counters already having this constraint. Thus, the Galileo data are accessible in environments where those of GPS L1C are no longer so.

The method of the invention may be implemented in various transmission systems other than those of radionavigation satellites, for example multi-transmission systems (transmission of data on channels which differ over time, in space and in frequency), or else RF radiobroadcasting systems, cooperative or otherwise, or else even simply when wishing to gain bandwidth (by then coding the data less robustly). Generally, the invention may be implemented in any system where the receiver is connected simultaneously to several transmitters, for example in the field of digital radiobroadcasting, TDT (terrestrial digital television), television transmitted by portable telephone of G3S type, etc.

The invention claimed is:

1. A data communication method, comprising:
using a transmission system to:
encode data or a data set to be transmitted;
add, as a preamble to each said encoded datum or data set, an identifier that is shorter than the datum or data set as a whole and is coded to enable more robust acquisition than said datum or data set; and
repeatedly transmit said data or data sets, including said preambles; and
using a receiver to:
receive said data or data set;
identify said data or data set using said identifier;
accumulate energy contained in the received data or data sets having a same identifier; and
determine, when a sufficient quantity of energy has been accumulated, that the corresponding datum or data set is validly received.

2. The method as claimed in claim 1, wherein the method is implemented in a satellite radionavigation system.

3. The method as claimed in claim 1, wherein for data having a length of between 500 and 1000 bits, the corresponding identifiers have a length of between 9 and 52 bits.

4. The method as claimed in claim 1, wherein the method is implemented in a multi-transmission system.

* * * * *